Aug. 16, 1949.　　　L. E. KEENE ET AL　　　2,479,168
TEXTILE SPINDLE
Filed Feb. 7, 1948　　　3 Sheets-Sheet 1
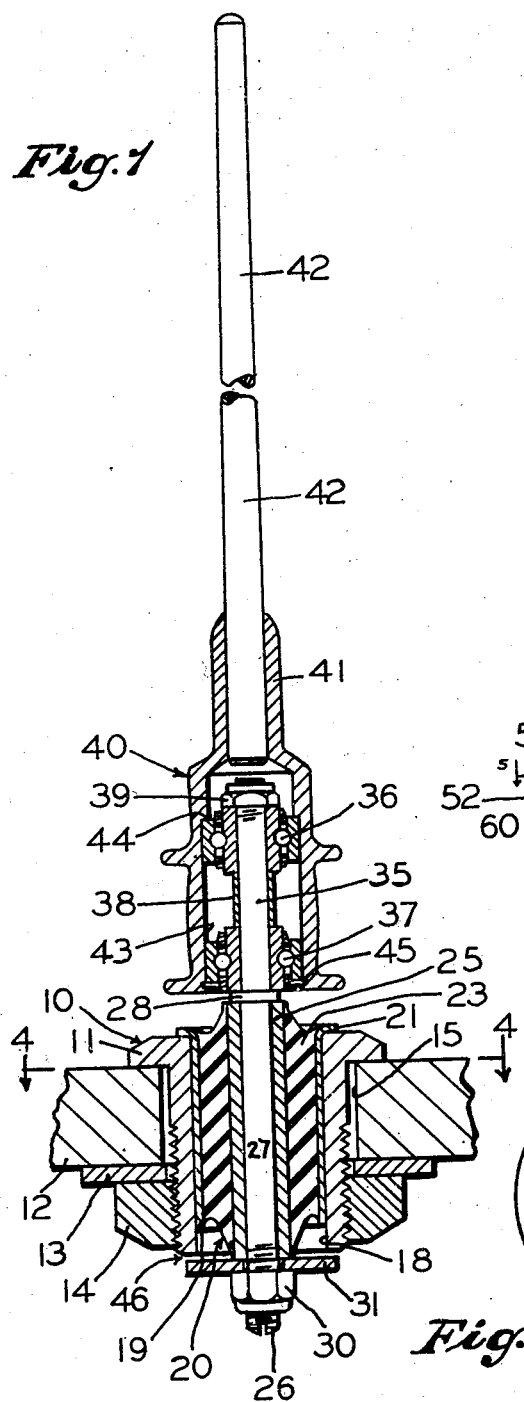
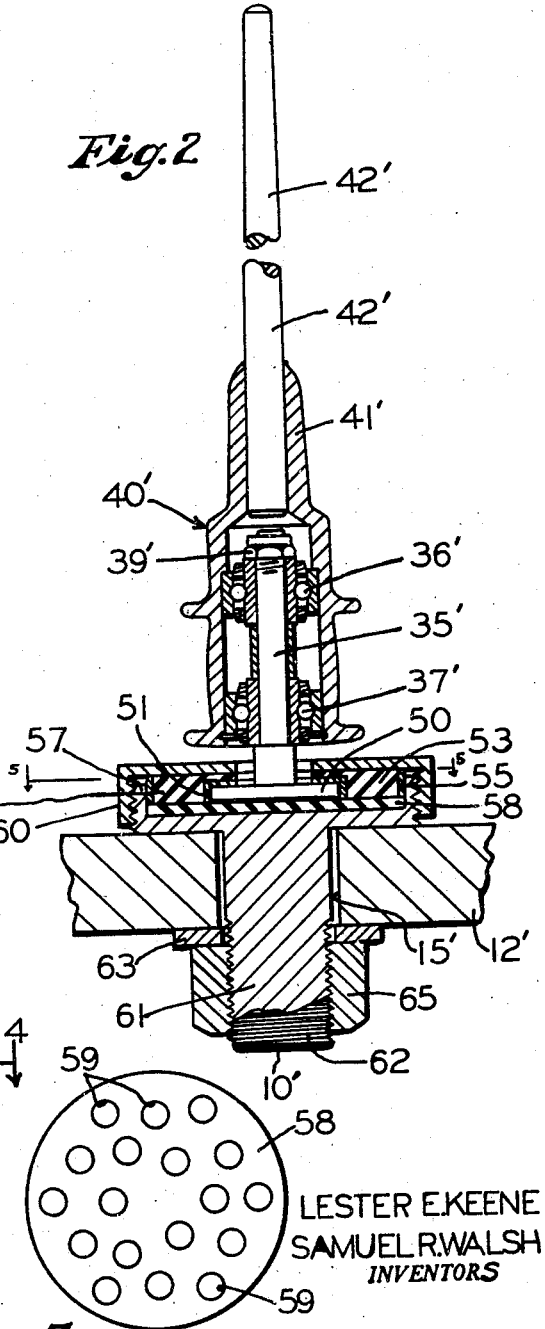
LESTER E. KEENE
SAMUEL R. WALSH
INVENTORS
BY W Russell Greenwood
ATTORNEY

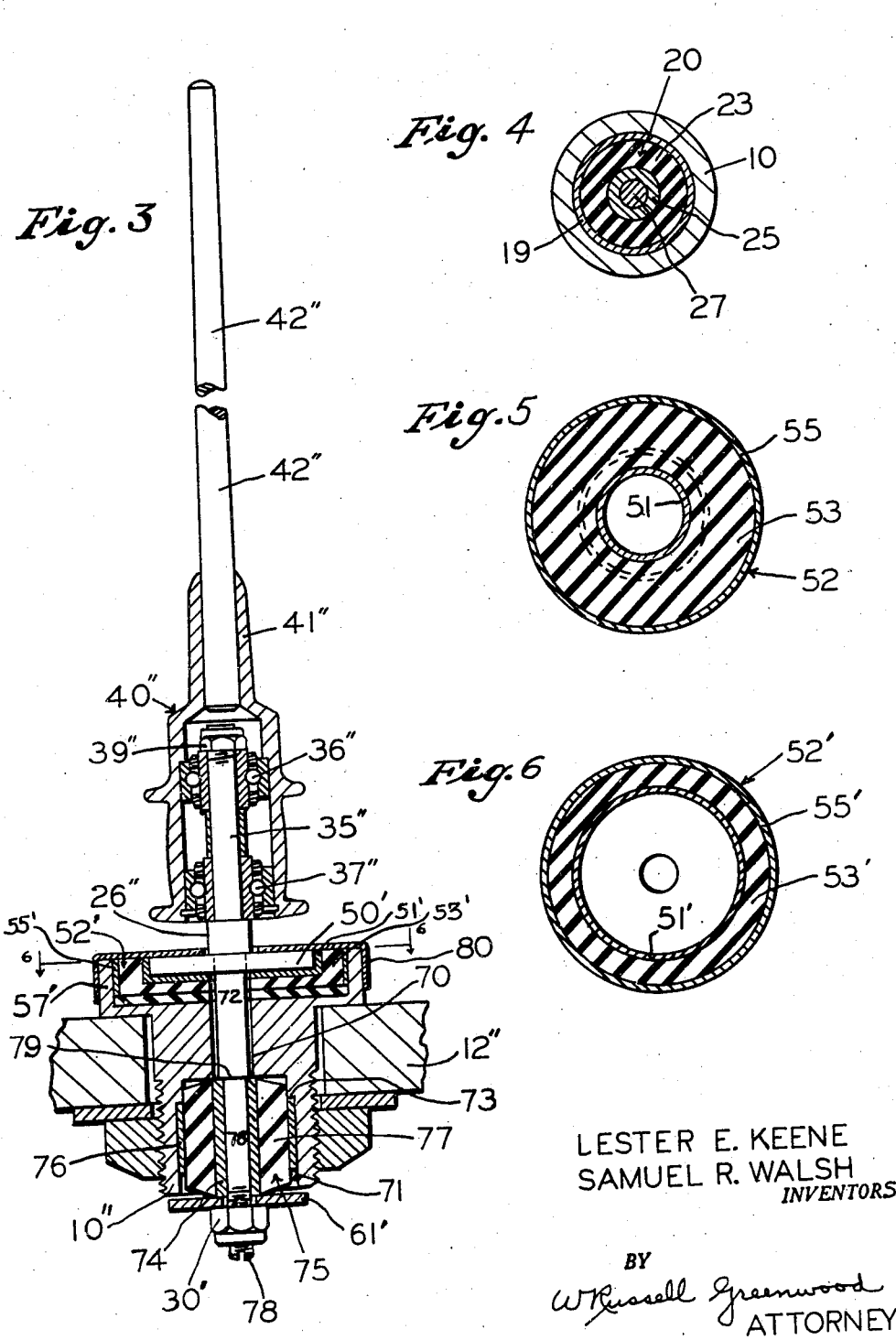

Aug. 16, 1949.

L. E. KEENE ET AL 2,479,168

TEXTILE SPINDLE

Filed Feb. 7, 1948

LESTER E. KEENE
SAMUEL R. WALSH
INVENTORS

BY
W Russell Greenwood
ATTORNEY

Patented Aug. 16, 1949

2,479,168

UNITED STATES PATENT OFFICE 2,479,168

TEXTILE SPINDLE

Lester E. Keene, Newtonville, and Samuel R. Walsh, South Attleboro, Mass., assignors to H & B American Machine Company, a corporation of Maine Application February 7, 1948, Serial No. 6,944

14 Claims. (Cl. 57—130)

This invention relates to textile spindles and, more particularly, is concerned with improvements in ball bearing spinning and twister spindles and the association with such spindles of mounting means for vibration control or isolation.

One of the objects of the present invention is the flexible mounting of a spindle of this class in a manner that will enable it to adjust itself to the true axis of rotation of the blade, bobbin, and the load as a normal running position.

Another object of the invention is the resilient supporting of the member sustaining the rotary parts of the spindle whereby the rotary blade, bobbin, and the load will be self-centering during rotation to accommodate their oscillatory movements yet will remain steady at all normal running speed when carrying heavy loads.

A further object of the present invention is to provide a resilient mounting for a textile spindle of the type indicated so constructed and arranged that the vibration of the spindle will be reduced substantially to a minimum when carrying bobbins which are badly balanced or very heavy, or the speed of rotation is very high.

A still further object of the invention is to provide a ball bearing spindle which is characterized by a great capacity for damping vibration and for isolating vibration from the framework of the textile machine.

One feature in the spindle structure of this invention is the provision of a whorl rotatable on ball bearing means housed entirely within the whorl and arranged upon a stationary post, and a rubber bonded mounting unit prestressed in initial tension and flexibly supporting the post with the base member of the spindle assembly.

Another feature of the invention is the provision in a textile spindle of the type indicated of rubber bonded generally tube-form mounting means in initial tension and fixedly secured with the central post and the base member of the spindle assembly.

Another feature of the invention is the resilient supporting of the spindle assembly by shear-stressed rubber mounting means which is so constructed and arranged as to provide soft suspension in the direction, or directions, of the disturbing forces, and will provide stability, or resistance to movement, in directions normal to the major thrusts.

Another feature of the invention is the provision in a twister spindle structure of means associated with the rubber mounting means and the stationary support for the rotary parts for providing vertical adjustment of the stationary support member relative to the rubber mounting means to enable desired alignment and vertical adjustment operations of the bobbin seating surface of the whorl.

Another object of the invention is to provide a textile spindle of the type indicated which is of compact and simple construction, economical to manufacture, and the parts so arranged as to reduce the possibility of relative vibration of the parts to a minimum.

Further objects, features, and advantages of the invention are set forth in the following specification which describes several forms of construction of the improved spindle, by way of example, as illustrated by the accompanying drawings.

In the drawings:

Fig. 1 is a longitudinal sectional view of a spinning spindle incorporating certain novel features of the present invention;

Fig. 2 is a longitudinal sectional view of a spinning spindle showing an alternative form of mounting applied thereto;

Fig. 3 is a longitudinal sectional view of a spinning spindle showing another alternative mounting arrangement applied thereto;

Fig. 4 is a sectional view of the mounting device taken on the line 4—4 of Fig. 1;

Fig. 5 is a transverse sectional view of the mounting device "per se" employed in the spindle structure of Fig. 2, taken on the line 5—5 thereof;

Fig. 6 is a transverse sectional view of the mounting device "per se" employed in the spindle structure of Fig. 3, taken on the line 6—6 thereof;

Fig. 7 is a detail plan view of the compressible rubber disc associated with the resilient tube-type mountings cooperating with the foot member of the arbor, as embodied in the mounting arrangements illustrated in Figs. 2 and 3.

Figure 8:
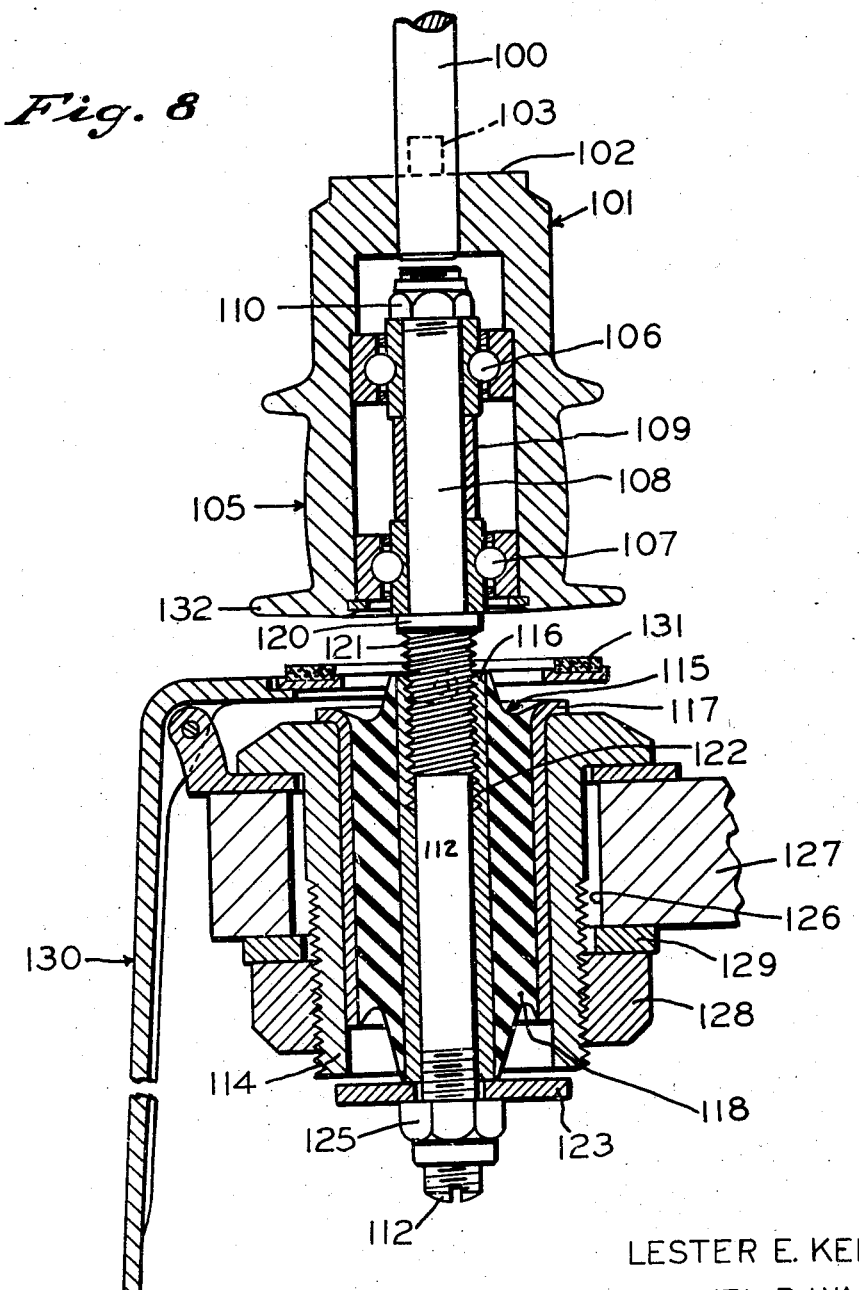
Fig. 8 is a longitudinal sectional view of a twister spindle incorporating the novel features of the present invention.

It is well known in the operation of ball or roller bearing spindles that when the bobbin carried by the rotating blade is badly balanced or very heavy, or the speed of rotation is very high, the spindle blade and the bobbin mounted thereon undergo slight lateral deflection and rotate about a geometric axis which is not only not coincident with the true geometric axis of the spindle and in which the point of support does not coincide with the center of gravity of the spindle blade and the bobbin carried thereon. Consequently, the spindles set up periodic disturbing forces which give rise to violent chattering or enforced vibrations when being brought up to their nomal running speed. These vibrations become more frequent, irregular and jerky during the period in which the spindle passes through its critical speed of rotation, and the rotating mass executes oscillatory movements and precession motion tends to take place. This disturbing effect acts to increase the bearing stress and gives rise to rapid wear on the ball or roller bearings, and is often accompanied by binding of the blade therein. Frequent breakages of the strand of textile material being twisted results, in many instances, as it leaves the delivery end of the machine as a result of such intensified vibrations.

With the idea of controlling or of isolating the vibration difficulties above mentioned, one aim of the present invention is to resiliently support the rotary parts of the spindle by means so constructed and arranged as to accommodate the gyratory and/or oscillatory movements partaken by the spindle blade, bobbin and the load carried thereon during normal running as well as to enable self-centering movements thereof, and also to check any harmful secondary vibrations and steady the blade and the bobbin, and to counteract movements of precession whereby their actual rotation will be about an axis passing through the point of support of the spindle blade with its unbalanced load. This point of support of the stationary arbor or central post coincides with the center of oscillation of the spindle. There will be both upper and lower precession cones, the apexes of which coincide with the point of support of the arbor or post which, in the present instance, will be the neutral axis of the rubber mass disposed between the arbor and the spindle base member. The portion of the arbor below such neutral axis or point of support thus has the effect of a damping cone on the upper cone formed by the oscillation of the bobbin with the rotating spindle blade. The oscillatory movements thus executed by the lower portion of the arbor below the point of support are damped by means of the resistance of the rubber, the influence of which tends to counteract the tendency of precession motion.

As shown in the patent to Logan No. 345,157, patented July 6, 1886, rubber has been used hitherto for vibration damping of textile spindles, in which instance, the rubber member so used has been placed under compression, by manual turning of a threaded cap member in the proper direction, to secure the parts in their proper relationship and also provide the desirable cushioning action. While rubber under compression has some damping effect depending on the amount of compression, as ordinarily compressed the resultant damping effect is negligible. By placing the rubber under tension its damping effect may be greatly increased and if given initial tension a small body of rubber may be utilized for supporting a load of considerable magnitude. It is preferable to so arrange the rubber that the major thrust on the mounting subjected to vibration is resisted through the action of shear on the rubber, and in the present invention the four preferred forms illustrated are so arranged. Here, the gravity thrust of the rotating spindle assembly and the axial thrust incident to doffing shock as well as the radial and torsional thrusts arising by reason of the oscillatory movement of the upper portion of the spindle blade, bobbin and the load operate on the rubber in shear.

Referring to Figs. 1 and 4 of the drawings, the spinning spindle there shown comprises a relatively short base member 10 in the form of a flanged tubular collar having an enlarged circular flange 11 at its upper end. The base 10 is adapted to be clamped to the usual spindle rail 12 of the spinning frame by means of a washer 13 and a clamp nut 14 threaded directly upon the externally threaded lower end portion of the base member 10. The cylindrical body portion of the base member 10 extends loosely through the usual circular aperture 15 in the rail 12 and is made sufficiently smaller in diameter than the aperture 15 to provide sufficient clearance for performing the conventional centering adjustment and the plumbing operation of the base member on the rail.

The base member 10 has a central cylindrical bore 18 therethrough into which is pressed the outer metallic shell 19 of the tube-form resilient mounting unit 20. The upper end of the mounting unit 20 is provided with an enlarged flange 21 which engages the upper end face of the flange 11. A resilient rubber member 23 of annular form extends from the outer shell 19 to an inner metallic shell or central sleeve 25. An upstanding stationary central post or arbor 26 has a lower portion 27 adapted to extend through and fit snugly into the central bore of the inner metallic shell 25 of the resilient mounting unit 20. The rubber member 23 is secured to the metallic shell members 19 and 25 respectively through a surface and radial tension-resisting union therewith. This rubber preferably is bonded by a vulcanized union with the inner and outer shells 19 and 25, and is placed under initial tension. This may be accomplished by vulcanizing the rubber in place and putting the rubber under initial tension as the rubber shrinks as it cools in vulcanization, in accordance with the disclosure of the Lord Patent No. 1,452,693, granted April 24, 1923. Thus, the normal load of the spindle structure will be held by the rubber under tension and may be made as yielding or as soft as may be desired, that is to say, the rubber may be increased in length increasing the rate of increase of resistance to movement, or it may be made shorter, thus reducing the rate of increase of resistance and the same effects may be accomplished by increasing the diameter of the outer shell 19 and the radial dimensions of the rubber wall of the member 23.

The central post 26 extends entirely through the inner shell 25 and has a shoulder or collar 28 arranged at an intermediate portion. The shoulder 28 is held clamped against the upper end of the inner shell 25 by means of an "elastic" stop nut 30 and a washer 31 which, in turn, is clamped against the lower end of the inner shell 25 upon tightening of the nut 30 on the screw threaded end extension 32 of the central post 26.

The central post 26 has integral therewith an upper cylindrical stem portion 35 above the shoulder 28, and mounted upon this stem portion are a pair of ball bearing units 36 and 37, preferably of the double seal type. A spacer 38 is arranged on the stem 26 between the ball bearing units 36 and 37 and the assembly is held clamped together by a nut 39 which has threaded engagement with the threaded upper end portion of the stem 35.

A whorl 40 having the usual acorn 41 with the spindle blade 42 fast therein is recessed at its under side, as at 43, to provide a depending annular belt-engaging skirt portion which extends down over and encompasses the stem 35 whereby both ball bearing units 36 and 37 are entirely housed within the interior of the whorl. The lower end of the recess 43 is counterbored to provide the inner annular shoulder 44. The outer race ring of the upper ball bearing 36 engages against the shoulder 44 while a spring lock ring 45 secures the outer race ring of the lower ball bearing with the whorl. The inner and outer race members of the ball bearing units 36 and 37 respectively preferably are secured by a light press-fit to the whorl and the stem respectively. If desired, injection-lubricated type ball bearing units may be utilized in lieu of the double seal type ball bearing units 36 and 37 illustrated in the drawings by appropriate modification of the whorl to provide ports for insertion of the needle. The whorl 40 and the blade member 42 thus are arranged for free rotation upon the central post 26.

The washer 31 is installed as shown and has the portion bounding its central hole in contact with the lower end of the inner shell 25. Suitable clearance is provided between the lower end of the base 10 and the outer marginal portion of the washer 31, as indicated at 46, to enable limited movement of the central post 26 under ordinary overload or shock for safety purposes.

The nuts 30 and 39 preferably are of the type known as "elastic stop nuts" incorporating a locking collar of vulcanized fiber and of the general structure made by the Elastic Stop Nut Corporation of America, Union, New Jersey.

From the foregoing description, it will be seen that the rubber mounting unit 20 is so constructed and arranged as to respond to the radial, torsional and axial thrusts on the arbor through a shear stress or distortion of the rubber and resist oscillatory and/or gyratory movements of the arbor and the load during the running of the spindle.

The resilient mounting unit 20 preferably is of the rubber bonded, shear type, tube-form mounting, double extension construction, manufactured by the Lord Manufacturing Company of Erie, Pennsylvania, and of the general construction disclosed in H. C. Lord Patents Nos. 1,452,693; 1,778,197 and 1,778,503.

Fig. 2 shows a spinning spindle embodying an alternative form of resilient mounting applied thereto, the general spindle construction being similar to that illustrated in Fig. 1 according to the arrangement above described in that the revolving whorl 40' carrying the spindle blade 42' is freely rotatable upon the cylindrical stem 35' by means of ball bearing units 36' and 37' which are housed entirely within the interior of the depending annular belt-engaging skirt portion of the whorl. Both ball bearing units 36' and 37' are of the double seal type arranged in spaced relationship upon the upright stem member 35' corresponding to the upper extension of the normally stationary central post or arbor 26 according to the Fig. 1 arrangement above-described. The Fig. 2 arrangement differs from that of Fig. 1 in that the stem member 35' is provided at its lower end with an enlarged circular foot 50 which is pressed into the cup-like inner metallic shell 51 of the resilient mounting unit 52. The mounting unit 52 comprises a rubber ring member 53 interposed between the inner metallic cup-like shell 51 and the annular outer metallic shell 55. The rubber of the ring 53 preferably is bonded by a vulcanized union with the outer shell 55 and the inner cup 51 in accordance with the disclosure of the Lord Patent No. 1,452,693, thereby putting the rubber, during vulcanization, under initial tension through cooling of the rubber after vulcanization. The outer shell 55 has a sliding fit within the cup portion of the enlarged upwardly directed cup-like flange 57 provided at the upper end of the base member 10'. As illustrated in Fig. 2, the mounting unit 52 rests in contact with an elastic disc member 58 of compressible rubber arranged within the cup portion of the flange 57 between the bottom wall thereof and the inner end of the mounting unit 52. The rubber disc 58 is provided with a plurality of holes 59 therethrough to allow for flow of the rubber when the disc is compressed by pressure applied thereto by the mounting unit 52 as it is caused to move inwardly of the cup upon appropriate tightening movements of the threaded cap member 60 upon the externally threaded portion of the flange 57.

This base member 10' has a solid cylindrical shank section 61 which has a loose fit and extends through the usual circular aperture 15' of the spindle rail 12'. The lower end portion of the shank 61 is provided with external threading 62 over which is arranged a washer 63 and a clamp nut 65 threaded thereon whereby the base 10' is rigidly clamped to the spindle rail 12' of the spinning frame (not shown) upon tightening of the nut 63 to draw the flange 57 and the washer 63 into tight engagement with opposite sides of the spindle rail.

Fig. 3 shows a spinning spindle embodying another alternative form of resilient mounting applied thereto, the arrangement in general being similar to that of Fig. 2 just described by differing therefrom in that coaxial with the enlarged cup-like flange 57' and the base member 10'' is a central bore 70 communicating with a recess 71 in the bottom of the base 10''. The central post 26'' has a simulated foot member 50' which may be formed either integral or as a collar fast with the post, the foot being located intermediate the ends of the post 26''. The foot member 50' is pressed into the cup-like inner shell 51' of the resilient mounting unit 52'. A rubber member 53' is interposed between the inner shell 51' and the cup-like outer metallic shell 55'. The rubber member 53' preferably is bonded by a vulcanized union with the inner and outer shells 51' and 55' in accordance with the disclosure of the Lord Patent No. 1,452,693 thereby putting the rubber, during vulcanization, under initial tension through cooling of the rubber in vulcanization. The outer shell 55' is slidably pressed into the cup portion of the enlarged cylindrical flange 57' provided at the upper end of the base member 10''.

The lower section of the post 26'' below the so-called foot member 50' comprises a cylindrical shank portion 72 having a loose fit in the bore 70 and extends through the base member 10''. The lower end of the bore 70 is counterbored to provide the recess 71 presenting the internal shoulder 73 against which the inner end of the inner shell 74 of the resilient rubber mounting unit 75 engages. The resilient mounting unit 75 further includes an outer metallic shell 76 between which and the inner shell 74 is directly disposed a rubber wall member 77. The rubber member 77 preferably is bonded by a vulcanized union with the inner and outer shells 74 and 76 respectively in accordance with the disclosure of the Lord Patent No. 1,452,693 thereby putting the rubber during vulcanization, under initial tension, through cooling of the rubber in vulcanization. The outer shell 76 is pressed into the recess 71 of the base 10". The inner shell 74 is arranged upon the reduced shank portion 78 and is held clamped against the shoulder 79 at the lower end of the bore 70 by means of the washer 61' which is drawn into tight engagement with the outer end of the shell 74 upon tightening of the "elastic" stop nut 30' threaded upon the lower end of the shank 78. The base member 10" is set into the spindle rail 12" through the aperture 15" and is clamped in position in the rail by a suitable nut 14' threaded upon the external threaded lower portion of the base member 10". The blade 42", the whorl 41" and ball bearing units 36" and 37" are arranged for rotation upon the stem 26" according to the arrangement of their corresponding elements in the Fig. 2 spindle structure above described and to which reference is made to details of the structure. In addition, as above described, the rubber mounting unit 52' is constructed in accordance with the construction of the corresponding mounting unit 52 embodied in the Fig. 2 spindle structure. However, the screw threaded cap member 60 of the Fig. 2 device is eliminated and in lieu thereof an annular press-on cap member 80 of sheet metal is substituted since in the Fig. 3 arrangement simultaneous compression and pre-loading of the resilient mounting unit 52' and 75 is effected by the tightening action of the "elastic" stop nut 30' on the lower shank extension 78.

Referring to Fig. 8 wherein there is illustrated a mounting device embodying the present invention applied to a twister spindle, the spindle blade 100 is fixedly secured to the usual driving whorl 101 having at its upper end the bobbin seat 102 and driving key 103 and a lower depending belt-engaging annular skirt portion 105 housing the ball bearing units 106 and 107 and encircling the upright stem member 108. The ball bearing units 106 and 107 have their outer race members fixed within the whorl skirt 105 and their inner race members arranged upon the stem 108 spaced apart thereon by the spacer 109 and clamped tightly in place by the elastic stop nut 110 threaded upon the upper end of the stem 108. The stem 108 is in axial alignment with the blade 100 and forms an extension of the upper portion of the arbor or central post 112 which constitutes a normally stationary standard. Thus, the rotary parts of the spindle structure form a unit with the stationary arbor or post 112 the lower portion of which is flexibly supported in the tubular base member 114 by means of the rubber bonded tube-type mounting unit 115 disposed between the arbor and the base member. The rubber mounting has concentric inner and outer metallic shells 116 and 117 respectively, and an annular rubber member 118 secured to both shells by vulcanization or surface union therewith. The rubber is preferably bonded to the inner shell 116 and the outer shell 117 in accordance with the disclosure of the Lord Patent No. 1,452,693, thereby putting the rubber, during vulcanization, under initial tension through cooling of the rubber after vulcanization. The outer shell 117 is then pressed into the bore of the tubular base member 114. The rubber member 118 has the rubber so constructed and arranged as to respond to radial, torsional, and axial thrusts on the arbor through a shear distortion of the rubber whereby relative oscillatory movements of the arbor during running of the spindle and the endwise thrusts incident to doffing operations will be resisted and substantially counteracted.

The arbor or post 112 is provided intermediate its ends with an enlarged circular flange or collar 120 below but proximate to the bottom flange 132 of the whorl 101 and the portion of the arbor below the flange 120 is threaded, as at 121, for screw threaded connection with the threaded counterbore 122 at the upper end portion of the inner shell 116 of the rubber, tube-type mounting unit 115. Thus, the arbor 109 and the rotary parts may be adjusted vertically by means of the screw-threaded parts 121 and 122 and a suitable screw driver slot provided in the end of the arbor to effect alignment of the bobbin seat to secure proper lay of the strand being wound. The arbor 112 is clamped securely in its desired adjusted position in the inner shell 116 by the clamping effect between the screw-threaded connection 121 and the metal washer 123 as the latter is clamped against the lower end of the inner shell 116 during tightening of the "elastic" stop nut 125 on the threaded end projection of the arbor or post 112. Metal washer 123 also is installed as shown for safety purposes to limit endwise movement under ordinary overload or shock thrusts. The recessed or cupped ends of the rubber member 118 of the mounting unit 115 are provided to throw the flexing action away from the metal parts of the mounting 115 and into the rubber member 118 thereof.

As illustrated, the base member 114 is of relatively short length and of such axial dimensions as to extend through the usual opening 126 for the spindle in the spindle rail 127 and extends beyond the top and bottom surfaces thereof for a distance sufficient to accommodate the clamping nut 128 and washer 129 which are arranged upon the threaded lower end portion of the base member 114. The spindle is provided also with a knee brake 130, having a ring 131 of friction material which coacts with the under surface of the lower flange 132 of the whorl 101 when intermittently actuated by the operator to apply pressure to the flange 132 to stop the spindle, the brake being of well known construction to those skilled in the art and need not be described in detail since it "per se" forms no novel part of the present invention.

In the arrangements represented in Figs. 1, 2, 3 and 8 the central arbors 26, 35', 26" and 112 respectively constitute normally stationary standards in axial alignment with their respective blades and these arbors are held rigidly in the inner shell of their resilient mounting units whereby both the arbor and the inner shell will participate in the oscillatory movements of the rotating parts of the spindle. By reason of the rubber mounting unit it will be seen that the arbor is mounted for freedom of movement in all directions of thrust relative to the spindle base member. Such movements are damped or resisted by the frictional resistance of the rubber and acting on the rubber at its neutral axis, the effect of which also tends to counteract the tendency of precession motion.

The rubber tube-form mounting units 20, 75 and 115 illustrated in Figs. 1, 3 and 8 respectively each have their respective rubber members longer at the inner metallic shells than at the outer metallic shells. The opposite ends of the rubber members of the mounting units 20 and 115 are cupped.

It will be observed from the foregoing specification that the present invention provides a spinning or a twister spindle construction which is extremely compact, economical to manufacture, and flexibly mounted in a manner whereby it will respond to the radial, torsional, and axial thrusts on the arbor through a shear stress of the rubber so as to be self-centering during rotation and will readily accommodate itself to rotation about its point of support during actual running of the spindle.

It will be observed that the bonded rubber shear type mountings isolate the rail and the framework of the spinning or twisting machine from spindle vibration and endwise thrusts incident to doffing shock as well as extend the life of the spindle assembly.

While several forms of construction of the improved spindle are herein illustrated and described, it is to be understood that further modifications may be made in the form and arrangement of its parts without departing from the spirit or scope of the invention. Therefore, without limiting ourselves in this respect, we claim:

1. In a textile spindle, the combination of an arbor constituting a normally stationary standard, a whorl arranged for rotation on said arbor, a blade fast to said whorl, a base member, and a resilient mounting device fixedly securing said arbor to said base and constituting a flexible support for said arbor, said mounting device comprising two annular metallic members spaced apart, and a resilient rubber member in initial tension disposed between said metallic members and secured thereto through a vulcanized union with said metallic members and sustaining the radial, torsional, and axial thrusts on the arbor incident to running of the spindle.

2. In a textile spindle, the combination of an arbor constituting a normally stationary standard, a whorl arranged for rotation on said arbor, a blade fast to said whorl, a base member, a rubber bonded tube-form mounting device between said arbor and said base member comprising a rubber member in initial tension, an annular metal shell arranged within the rubber member, and an annular metal shell arranged on the outer surface of the rubber member, the inner shell having a press fit with the arbor and the outer shell having a press fit with the base member.

3. In a textile spindle, the combination of an arbor constituting a normally stationary standard and having a shoulder at an intermediate portion thereof, a whorl arranged for rotation on said arbor, a blade fast to said whorl, a base member, a resilient mounting device between said arbor and said base member, said mounting device comprising a rubber member in initial tension, a metal shell within the rubber member and secured by vulcanized union thereto, a metal shell arranged on the outer surface of the rubber member and secured by vulcanized union thereto, an end engaging surface on the outer shell in contact with the base member, and means on the arbor for clamping the inner shell endwise against the shoulder of the arbor.

4. A mounting for textile spinning and twister spindles comprising the combination with a spindle rail, of a tubular base member affixed to said rail, a whorl, a blade fixedly secured to said whorl, a normally stationary upstanding post in axial alignment with said blade and having at its upper end a stem portion, a pair of ball bearing units within said whorl supporting said whorl for rotation on the stem, and a resilient mounting device directly interposed between said post and said base member, said mounting device comprising inner and outer concentric annular metallic members, and a body of resilient rubber disposed between and connected with said inner and outer annular members through vulcanization, said rubber being under initial tension and resisting the major thrust through shearing action and tension on the rubber between its surfaces and the respective opposing surfaces of the said inner and outer annular members.

5. A textile spindle comprising three coaxial members of which one is a rotatable spindle blade and the other two being stationary and comprising a rigid upright support member for said blade and a base member, bearing means rotatably mounting said blade upon said support, and resilient mounting means including a rubber member in initial tension affixing said support member with said base member, the point of support of the spindle being substantially coincident with the center of oscillation of the spindle blade, bobbin and the load, and also lying in a plane substantially coincident with the neutral axis of the rubber member of said mounting.

6. A textile spindle comprising a base member, a whorl, a blade member fixedly secured in said whorl, a stationary upright support for said blade and whorl, said blade and said support therefor being coaxial with respect to each other and also to said base, anti-friction bearings rotatably mounting said whorl on said support, and resilient mounting means including a rubber member in initial tension affixing said support with said base member, the point of support of the spindle being substantially coincident with the center of oscillation of the spindle blade, bobbin and the load, and also lying in a plane substantially coincident with the neutral axis of the rubber member of said mounting.

7. In a spinning or twister spindle, the combination with a whorl, a spindle blade fast with said whorl, a central stationary upright post having a cylindrical stem at its upper end portion on which said whorl is rotatively mounted and also carrying an enlarged circular flange located below said stem, of a mounting structure for said post comprising a base having at its upper end an enlarged upwardly directed cup, an annular resilient mounting unit within said cup between the flange of said post and the side walls of said cup, said unit comprising inner and outer concentric annular metallic members and a rubber ring between and integrally bonded to said metallic members, said post being supported in an upright position by said flange which is held tightly within the inner annular metallic member of said resilient mounting unit, the outer annular metallic member of said unit being arranged to have sliding engagement with the inside upwardly directed walls of said cup, and a resilient member located within said cup between the bottom thereof and the lower ends of said annular resilient mounting unit and said flange, said mounting unit yieldably supporting said post for limiting the lateral and axial movements thereof incident to rotation of said whorl, blade, and a yarn package thereon.

8. In a spinning or twister spindle, the combination with a whorl, a spindle blade fast with said whorl, a central stationary upright post having a cylindrical stem at its upper end portion on which said whorl is rotatably mounted and also carrying an enlarged circular flange located below said stem, of a mounting structure for said post comprising a base having at its upper end an enlarged upwardly directed cup, an annular resilient mounting unit within said cup between the flange of said post and the side walls of said cup, said unit comprising inner and outer concentric annular metallic members and a rubber ring between and bonded to said metallic members with the rubber being placed under initial tension by vulcanization, the flange of said post being held tightly within said inner annular metallic member, said unit having a sliding fit with the side walls of said cup, and a resilient disc member located within said cup between the bottom thereof and the lower ends of said annular resilient mounting unit and said flange, said mounting structure yieldably supporting said post for limiting the lateral and axial movements thereof incident to rotation of said whorl, blade, and a yarn package thereon.

9. In a spinning or twister spindle, the combination with a whorl, a spindle blade fast with said whorl, a central stationary upright post having a cylindrical stem at its upper end portion on which said whorl is rotatably mounted and also carrying an enlarged circular flange located below said stem, of a mounting structure for said post comprising a base having at its upper end an enlarged upwardly directed cup, an annular resilient mounting unit within said cup between the flange of said post and the side walls of said cup, said unit comprising inner and outer concentric annular metallic members and a rubber ring between and bonded to said metallic members with the rubber being placed under intial tension by vulcanization, the flange of said post being held tightly within said inner annular metallic member, said unit having a sliding fit with the side walls of said cup, a resilient disc member located within said cup between the bottom thereof and the lower ends of said annular resilient mounting unit and said flange, said mounting structure yieldably supporting said post for limiting the lateral and axial movements thereof incident to rotation of said whorl, blade, and a yarn package thereon, and means in pressure transmitting relation with the upper end of said annular resilient mounting unit and manually adjustable to apply endwise pressure to said resilient mounting unit for moving it bodily with said post downwardly within said cup to compress said resilient member and control the damping characteristics thereof to suit the operating requirements of the spindle when rotating with an unbalanced load.

10. In a spinning or twister spindle, the combination with a whorl, a spindle blade fast with said whorl, a central stationary upright post having a cylindrical stem at its upper end portion on which said whorl is rotatably mounted and also carrying an enlarged circular flange located below said stem, of a mounting structure for said post comprising a base having at its upper end an enlarged upwardly directed cup, an annular resilient mounting unit within said cup between the flange of said post and the side walls of said cup, said unit comprising inner and outer concentric annular metallic members and a rubber ring between and bonded to said metallic members with the rubber being placed under initial tension by vulcanization, the flange of said post being held tightly within said inner annular metallic member, said unit having a sliding fit with the side walls of said cup, a compressible disc member located within said cup between the bottom thereof and the lower ends of said annular resilient mounting unit and said flange, and an adjustable member on said cup and arranged to apply endwise pressure to said resilient mounting unit for moving said unit bodily with said post axially of said cup to compress said disc member and control the damping characteristics thereof whereby the conjoint damping characteristics of said annular resilient mounting unit and said disc will be controlled to suit the operating performance of the spindle when under an unbalanced load.

11. In a spinning or twister spindle, the combination with a central stationary vertical post provided with a circular flange, and a whorl having a spindle blade fast thereto and anti-frictionally mounted to rotate on said post, of a mounting structure comprising a base adapted to be secured to a spindle rail of a spinning or twisting frame, said base being formed at its upper end with an enlarged upwardly directed cup-shaped flange to house said circular flange of the post, an annular resilient rubber mounting unit within said cup surrounding said flange of the post and located between said flange and the upright walls of said cup, said rubber mounting unit being tightly affixed to the circular flange of said post and arranged for bodily movement therewith axially within said cup upon the application of endwise axial pressure to said mounting unit, a detachable cap to be screwed upon said cup and engaging the upper end of said resilient mounting unit, and resilient cushioning means capable of being compressed between the lower ends of said circular flange and said mounting unit and the bottom of said cup upon appropriate rotation of said cap member upon said cup to control the damping characteristics of said rubber disc and said annular rubber mounting unit will operate to limit the lateral and axial movements of the central post incident to rotation of said whorl, blade, and a yarn package thereon.

12. In a ball bearing spinnning or twister spindle, the combination of a stationary spindle carrying a flange member, a whorl, a rotatable spindle blade fast to said whorl, said stationary spindle having a cylindrical stem extension arranged within said whorl in spaced coaxial relation with said blade, ball bearings between the stationary spindle and said whorl and sustaining the latter for free rotation thereabout, a base having fixed to its upper end an enlarged cup, and yielding mounting means for said stationary spindle within said cup between the side walls thereof and said flange of the stationary spindle, said yielding mounting means comprising an annular member of resilient vulcanized rubber placed under initial tension and fixedly secured to said flange of the stationary spindle, and a perforated rubber disc located within said cup and compressed between the bottom of said rubber annular member and the bottom of the cup.

13. A textile spindle comprising a base having at its upper end an enlarged upwardly directed cup-like flange; a blade member; a whorl fast with said blade member and having a depending annular belt-engaging skirt portion; a central post in axial alignment with said blade and constituting a normally stationary support for said whorl and blade, said post presenting an upright cylindrical stem portion extending upwardly from an enlarged circular flange element, said stem being completely encircled by said whorl skirt portion; spaced anti-friction bearing units arranged within said whorl skirt portion between said whorl and said stem and supporting said whorl and its blade for free rotation around said stem, a resilient mounting unit within said cup between the upstanding side walls thereof and said circular flange, said mounting unit comprising inner and outer annular metallic shells and an annular rubber member disposed between said metallic shells and bonded thereto by vulcanization placing the rubber under initial tension; said outer shell having a sliding fit with the side walls of said cup and said circular flange being held tightly within said inner shell; a circular compressible elastic member arranged within said cup between the bottom thereof and the lower end of said resilient mounting unit; and means constructed and arranged to apply pressure in an axial direction to said resilient mounting unit to produce sliding movement of said unit and said post bodily relative to said cup and also to compress the material of a circular elastic member for varying the damping characteristics of said spindle.

14. A textile spindle comprising a base having at its upper end an enlarged upwardly directed cup-like flange; a blade member; a whorl fast with said blade member and having a depending annular belt-engaging skirt portion; a central post in axial alignment with said blade and constituting a normally stationary support for said whorl and blade, said post presenting an upright cylindrical stem portion extending upwardly from an enlarged circular flange element, said stem being completely encircled by said whorl skirt portion; axially spaced ball bearing units arranged on said stem and housed entirely within the interior of said whorl skirt portion for supporting said whorl and its blade for free rotation around said stem, each of said ball bearing units having inner and outer race rings in which the outer race rings of both bearing units are held tightly with said whorl and rotate therewith, the inner race rings of said bearing units being detachably secured on said stem and held stationary; a resilient mounting unit within said cup between the upstanding side walls thereof and said circular flange, said mounting unit comprising inner and outer annular metallic shells and an annular rubber member disposed between said metallic shells and bonded thereto by vulcanization placing the rubber under initial tension; said outer shell having a sliding fit with the side walls of said cup and said circular flange being held tightly with said inner shell by having a pressed fit therein; a perforated compressible rubber disc member arranged within said cup between the bottom thereof and the lower end of said resilient mounting unit; and means constructed and arranged to apply pressure in an axial direction to said resilient mounting unit to produce sliding movement of said unit and said post bodily relative to said cup and also to compress the material of the rubber disc member for varying the damping characteristics of said spindle.

LESTER E. KEENE.
SAMUEL R. WALSH.

REFERENCES CITED

The following references are of record in the file of this patent:

UNITED STATES PATENTS

| Number | Name | Date |
| --- | --- | --- |
| 654,892 | Ham | July 31, 1900 |
| 2,304,370 | Neal | Dec. 8, 1942 |